Patented May 7, 1935

2,000,361

UNITED STATES PATENT OFFICE 2,000,361

PROCESS OF PREPARING DIHYDROXY-BENZENEARSONIC ACIDS

Karl Streitwolf, Frankfort-on-the-Main, and Alfred Fehrle, Bad Soden-on-the-Taunus, and Hans Hilmer, Frankfort-on-the-Main, Germany, assignors to Winthrop Chemical Company, Inc., New York, N. Y., a corporation of New York No Drawing. Application May 8, 1931, Serial No. 536,078. In Germany May 26, 1930

7 Claims. (Cl. 260—14)

The present invention relates to a process of preparing dihydroxybenzenearsonic acids.

We have found that dihydroxybenzenearsonic acids which may be further substituted in the benzene nucleus, are obtainable by treating with oxidizing agents a compound of the following general formula:

(OH)₂Ar—As=As—Ar—(OH)₂ wherein Ar stands for a benzene nucleus which may be further substituted.

The process is preferably carried out by treating an aqueous suspension of the arsenobenzene compound with oxidizing agents, as for instance, with hydrogen peroxide or a solution of iodine in an amount which is sufficient to oxidize the arsenic atoms to arsonic acid groups. Hereby the arsenobenzene is oxidized to the corresponding arsonic acid which is immediately dissolved in the water present during the oxidation process. The arsonic acid may be obtained from the aqueous solution in known manner, for instance, by evaporating the solution. It can be further purified by dissolving the residue in water, neutralizing the solution thus obtained with caustic soda solution and pouring it into acetone, whereby the sodium salt of the arsonic acid crystallizes.

The process can advantageously be utilized for separating the dihydroxybenzene-arsonic acid in a pure state and with a good yield from the reaction mixture in such processes by which the said acid was directly obtainable up to the present time only in a more or less contaminated form and with a small yield. In such a case the reaction mixture containing the dihydroxybenzenearsonic acid is treated with a reducing agent and the tetrahydroxyarsenobenzene which after isolation is obtained thereby free from impurities is oxidized as above indicated.

The following examples illustrate the invention, but they are not intended to limit it thereto.

(1) 1/20 mol. of 3,4,3′,4′,-tetrahydroxy-arsenobenzene is triturated with 3–5 times its weight of water and oxidized while cooling and stirring, with hydrogen peroxide. The solid matter is dissolved; the solution is purified with animal charcoal and then evaporated in a vacuum. The residue is taken up in a small quantity of water, filtered through animal charcoal and mixed with caustic soda solution until it is neutral to litmus paper. By pouring it into acetone the monosodium salt of the pyrocatechinarsonic acid is isolated. The salt has the following formula:

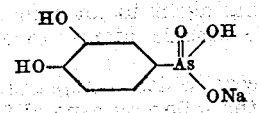

(2) 1/10 mol. of arsonic acid-pyrocatechin-carbamic acid ester (cf. our co-pending U. S. application Ser. No. 535,804 filed May 7, 1931) is saponified by means of 5 times its weight of 3N-hydrochloric acid, alkali is added until the solution is feebly alkaline to turmeric and the solution containing the sodium salt of 3.4-dihydroxy-benzene-1-arsonic acid is then reduced by means of sodium hydrosulfite. The further treatment is carried out as indicated in Example 1.

(3) 1/10 mol. of hydroxy-phenylarsonic acid is oxidized by means of potassium persulfate according to the process of German Patent No. 271,892, dated November 13, 1912, filed in the name of Farbwerke vorm. Meister Lucius & Brüning. After oxidation and boiling with hydrochloric acid the whole is neutralized by means of alkali and the solution thus obtained is reduced by means of hydrosulfite to the arsenobenzene, from which the pyrocatechinarsonic acid can be obtained in the manner indicated above.

(4) 5 grams of the arseno-dipyrocatechindiethylcarbamic acid ester, obtained by reduction of the corresponding arsonic acid (cf. our co-pending U. S. application referred to in Example 2) are heated on the steam bath with 10 cc. of caustic potash solution of 37° Bé. until the evolution of diethylamine is complete. The whole is then diluted with so much water that the solution can easily be filtered. On acidifying with acetic acid the tetra-hydroxy-arsenobenzene separates. It is oxidized to the pyrocatechinarsonic acid as indicated in Example 1.

(5) 36 grams of tetrahydroxyarsenobenzene are suspended in 200 cc. of water and the suspension is mixed with normal iodine solution until a sample of the mixture just colors potassium iodide starch paper. On the addition of the iodine, the insoluble matter is dissolved and a colorless liquid is produced. It is filtered after addition of animal charcoal and the strongly acid filtrate is rendered neutral by means of caustic soda solution. The mono-sodium salt of the pyrocatechinarsonic acid is isolated either by concentrating the solution until the crystallization begins or by precipitating with acetone. The yield amounts to about 37 grams.

(6) 20 grams of 5,5'-dinitro-3,4,3',4'-tetrahydroxyarsenobenzene are suspended in 100 cc. of water and the suspension is mixed with a normal iodine solution until a sample of the mixture just colors potassium iodide starch paper. The solution formed is filtered after addition of animal charcoal and concentrated until the nitropyrocatechinarsonic acid begins to separate. The yield amounts to about 17 grams. The acid has the following formula:

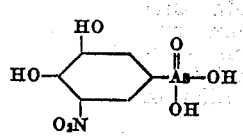

We claim:
1. The process which comprises treating a compound of the following general formula

(OH)₂Ar—As=As—Ar(OH)₂ wherein Ar stands for a benzene nucleus which may be further substituted by a nitro group with a mild oxidizing agent in an amount sufficient to oxidize the arsenic atoms to arsonic acid groups.

2. The process which comprises treating a compound of the following general formula

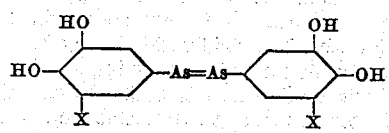

wherein X stands for a substituent of the group consisting of hydrogen and nitro, with a mild oxidizing agent in an amount sufficient to oxidize the arsenic atoms and arsonic acid groups.

3. The process which comprises treating a compound of the following formula

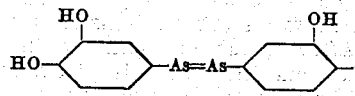

in an amount sufficient to oxidize the arsenic atoms to arsonic acid groups with a mild oxidizing agent.

4. The process which comprises treating a compound of the following formula

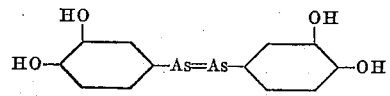

in an aqueous suspension with hydrogen peroxide in an amount sufficient to oxidize the arsenic atoms to arsonic acid groups, evaporating the solution thus obtained and, if required, purifying the product thus obtained by dissolving it in water, clearing the solution by addition of charcoal and by filtration, neutralizing it by addition of caustic soda solution and pouring it into acetone.

5. The process which comprises treating a compound of the following general formula

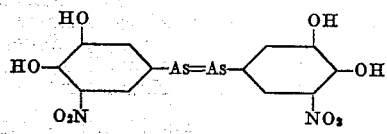

with a mild oxidizing agent.

6. The process which comprises treating a compound of the following general formula

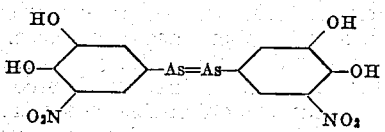

in an aqueous suspension with hydrogen peroxide, evaporating the solution thus obtained and, if required, purifying the product thus obtained by dissolving it in water, clearing the solution by addition of charcoal and by filtration, neutralizing it by addition of caustic soda solution and pouring it into water.

7. The process which comprises treating a compound of the following formula:

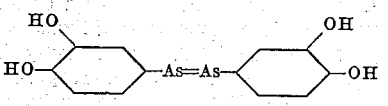

in an aqueous suspension with iodine solution until a sample of the mixture just colors potassium-iodide-starch-paper, clearing the solution by addition of charcoal and filtration, neutralizing it and precipitating the monosodium salt of pyrocatechinarsonic acid with acetone.

KARL STREITWOLF.
ALFRED FEHRLE.
HANS HILMER.